United States Patent
Zhao et al.

(10) Patent No.: US 8,179,570 B2
(45) Date of Patent: May 15, 2012

(54) GENERATING IMAGE EMBEDDED WITH UV FLUORESCENT WATERMARK BY COMBINING BINARY IMAGES GENERATED USING DIFFERENT HALFTONE STRATEGIES

(75) Inventors: Yonghui Zhao, Penfield, NY (US); Shen-ge Wang, Fairport, NY (US)

(73) Assignee: Xerox Corporation, Norwarlk, CT (US)

( * ) Notice: Subject to any disclaimer, the term of this patent is extended or adjusted under 35 U.S.C. 154(b) by 672 days.

(21) Appl. No.: 12/414,788

(22) Filed: Mar. 31, 2009

(65) Prior Publication Data

US 2010/0245928 A1    Sep. 30, 2010

(51) Int. Cl.
H04N 1/52 (2006.01)
H04N 1/60 (2006.01)
B41M 3/10 (2006.01)
G06K 19/06 (2006.01)

(52) U.S. Cl. ........ 358/2.1; 358/3.28; 358/518; 358/534; 235/491; 283/93; 283/113

(58) Field of Classification Search ............ 358/2.1, 358/3.06, 3.28, 518, 521, 534; 382/162, 382/167, 237; 235/491, 494; 283/85, 93, 283/113
See application file for complete search history.

(56) References Cited

U.S. PATENT DOCUMENTS

| | | | | |
|---|---|---|---|---|
| 5,710,420 | A * | 1/1998 | Martin et al. | 235/494 |
| 6,204,934 | B1 * | 3/2001 | Minamino | 358/1.9 |
| 6,763,122 | B1 * | 7/2004 | Rodriguez et al. | 358/3.28 |
| 6,844,941 | B1 | 1/2005 | Sharma et al. | |
| 7,050,195 | B1 * | 5/2006 | Jones | 358/3.28 |
| 7,058,199 | B1 * | 6/2006 | Au et al. | 358/3.28 |
| 7,126,721 | B2 * | 10/2006 | Wang et al. | 358/3.06 |
| 7,148,999 | B2 * | 12/2006 | Xu et al. | 358/3.06 |
| 7,180,635 | B2 * | 2/2007 | Wang et al. | 358/3.06 |
| 7,307,761 | B2 * | 12/2007 | Man | 358/3.28 |
| 7,656,557 | B2 * | 2/2010 | Fan | 358/3.06 |
| 7,800,785 | B2 * | 9/2010 | Bala et al. | 358/3.28 |
| 7,903,291 | B2 | 3/2011 | Bala et al. | |
| 8,009,329 | B2 | 8/2011 | Bala et al. | |
| 2007/0262579 | A1 | 11/2007 | Bala et al. | |
| 2007/0264476 | A1 | 11/2007 | Bala et al. | |
| 2008/0199785 | A1 | 8/2008 | Bala et al. | |

* cited by examiner

*Primary Examiner* — Scott A Rogers
(74) *Attorney, Agent, or Firm* — Fay Sharpe LLP

(57) ABSTRACT

Methods are provided for creating a fluorescent watermark within an image on a substrate, such as paper. The method involves creating a halftone image using two different halftone strategies. The halftone method is combined with a binary watermark mask to form two color patterns (e.g., one in a background region of the image and one in a watermark region of the image) and two successive-filling halftone algorithms, such that the ink droplets deposited by one color pattern cover more of the substrate than the ink droplets deposited by the other color pattern, with the two color patterns having approximately the same reflectance under normal light. However, under UV illumination, a visible difference (e.g., the watermark) is seen in the two patterns.

20 Claims, 10 Drawing Sheets

(7 of 10 Drawing Sheet(s) Filed in Color)

GENERATING IMAGE EMBEDDED WITH UV FLUORESCENT WATERMARK BY COMBINING BINARY IMAGES GENERATED USING DIFFERENT HALFTONE STRATEGIES

CROSS REFERENCE TO RELATED PATENTS AND APPLICATIONS

This application is related to U.S. Patent Publication No. 2007/0139681; U.S. Patent Publication No. 2007/0262579; U.S. Patent Publication No. 2007/0264476; and U.S. Patent Publication No. 2008/0199785. This application is also related to U.S. patent application Ser. Nos. 11/937,673 and 12/013,664. These applications are hereby fully incorporated by reference herein.

BACKGROUND

The present disclosure relates to the useful manipulation of fluorescence found in substrates and particularly most paper substrates as commonly utilized in various printer and electrostatographic print environments. More particularly, the teachings provided herein relate to methods of providing fluorescent watermarks.

Watermarking is a common way to ensure security in digital documents. Many watermarking approaches exist with different trade-offs in cost, fragility, robustness, etc. One approach is to use ultra-violet (UV) fluorescent ink rendering, to encode a watermark that is not visible under normal illumination, but subsequently identify the presence or absence of the watermark in a proffered document using a standard UV lamp. However, these fluorescent inks are costly to employ, and thus are typically only economically viable in offset printing scenarios, and thus only truly avail themselves of long print runs. Additionally, these materials are often difficult to incorporate into standard electro-photographic or other non-impact printing systems like solid ink printers, either due to cost, availability or physical/chemical properties. This in turn discourages their use in variable data printing arrangements, such as for redeemable coupons, for but one example.

It is desirable to be able to detect the counterfeiting, illegal alteration, and/or copying of a document, most desirably in a manner that will provide document security and which is also applicable for digitally generated documents. It is desirable that such a solution also have minimum impact on system overhead requirements as well as minimal storage requirements in a digital processing and printing environment. Additionally, it is highly desirable that this solution be obtained without physical modification to the printing device and without the need for costly special materials and media.

BRIEF DESCRIPTION

The present disclosure is directed to methods of encoding watermarks in images so that the watermark is not visible under ordinary lighting conditions, but is visible under ultraviolet light.

According to one aspect, a method of generating an ultraviolet (UV) fluorescent watermark in an image comprises selecting an electronic continuous-tone color image in an input color space for a document, generating a binary watermark mask that divides the continuous-tone color image into two regions including a watermark region and a background region, and performing a first color transformation that converts the continuous-tone color image in the watermark region from the input color space to a first CMY color space. The method further comprises executing a successive-filling halftoning algorithm with a dot-on-dot strategy on the continuous-tone color image in the watermark region to generate a first binary output image in the watermark region, performing a second color transformation that converts the continuous-tone color image in the background region from the input color space to a second CMY color space, and executing a successive-filling halftoning algorithm with a dot-off-dot strategy on the continuous-tone color image in the background region to generate a second binary output image in the background region. Additionally, the method comprises generating a watermarked binary output image embedded with UV fluorescent watermark by combining the first binary output image in the watermark region with the second binary output image in the background region, and printing the watermarked binary output image on a fluorescent substrate.

According to another aspect, a method of generating an ultraviolet (UV) fluorescent watermark in an image comprises selecting an electronic continuous-tone color image in an input color space for a document, performing a first color transformation that converts the continuous-tone color image from the input color space to a first CMY color space, and generating a binary watermark mask that divides the continuous-tone color image into two regions including a watermark region and a background region, the method further comprises executing a successive-filling halftoning algorithm with a dot-on-dot strategy on the continuous-tone color image in the watermark region to generate a first binary output image in the watermark region, performing a second color transformation that converts the continuous-tone color image in the background region from the first CMY color space to a second CMY color space, and executing a successive-filling halftoning algorithm with a dot-off-dot strategy on the continuous-tone color image in the background region to generate a second binary output image in the background region. Additionally, the method comprises generating a watermarked binary output image embedded with UV fluorescent watermark by combining the first binary output image in the watermark region with the second binary output image in the background region, and printing the watermarked binary output image on a fluorescent substrate.

According to another aspect, a system that facilitates generating UV fluorescent images using the successive-filling halftoning algorithms with both dot-on-dot and dot-off-dot strategies comprises a memory that stores, and a processor that executes, computer-executable instructions for selecting an electronic continuous-tone color image in an input color space for a document, and generating a binary watermark mask that divides the continuous-tone color image into two regions including a watermark region and a background region. The instructions further comprise performing a first color transformation that converts the continuous-tone color image in the watermark region from the input color space to a first CMY color space, executing a successive-filling halftoning algorithm with a dot-on-dot strategy on the continuous-tone color image in the watermark region to generate a first binary output image in the watermark region, and performing a second color transformation that converts the continuous-tone color image in the background region from the input color space to a second CMY color space. Additionally, the instructions comprise executing a successive-filling halftoning algorithm with a dot-off-dot strategy on the continuous-tone color image in the background region to generate a second binary output image in the background region, and generating a watermarked binary output image embedded with UV fluorescent watermark by combining the first binary output image in the watermark region with the second binary output image in the background region. The system further comprises a printer that prints the watermarked binary output image on a fluorescent substrate.

These and other non-limiting aspects and/or objects of the disclosure are more particularly described below.

BRIEF DESCRIPTION OF THE DRAWINGS

This patent or application file contains at least one drawing executed in color. Copies of this patent or patent application publication with color drawing(s) will be provided by the Office upon request and payment of the necessary fee.

The following is a brief description of the drawings, which are presented for the purposes of illustrating the disclosure set forth herein and not for the purposes of limiting the same.

DETAILED DESCRIPTION

Figure 1A:
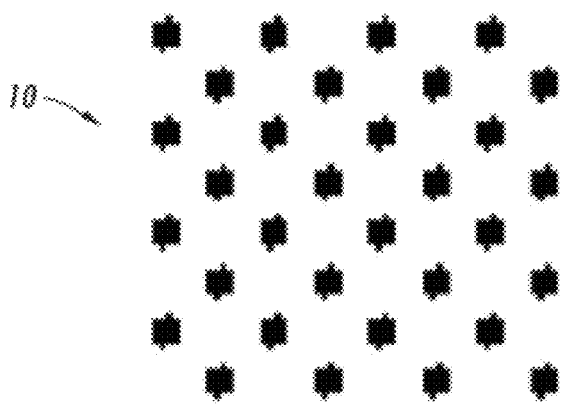
FIGS. 1A-B illustrate an example of a gray image rendered with two halftoning algorithms.

A more complete understanding of the processes and apparatuses disclosed herein can be obtained by reference to the accompanying drawings. These figures are merely schematic representations based on convenience and the ease of demonstrating the existing art and/or the present development, and are, therefore, not intended to indicate relative size and dimensions of the assemblies or components thereof.

Although specific terms are used in the following description for the sake of clarity, these terms are intended to refer only to the particular structure of the embodiments selected for illustration in the drawings, and are not intended to define or limit the scope of the disclosure. In the drawings and the following description below, it is to be understood that like numeric designations refer to components of like function.

For the purposes of clarity, definitions are provided for the following terms:

A "color" can be uniquely described by three main perceptual attributes. First, the hue is described by common names such as red, orange, yellow, green, blue, or purple (or some point on a continuum). Second, the colorfulness refers to the perceived intensity of the hue. Finally, the brightness denotes the extent to which the hue appears to exhibit light. These three attributes are typically described in terms of a "color space" such as the CIELAB color space.

A "colorant" is a dye, pigment, ink, or other agent used to impart a color to a material. Colorants, such as most colored toners, impart color by altering the spectral power distribution of the light they receive from the incident illumination through two primary physical phenomena: absorption and scattering. Color is produced by spectrally selective absorption and scattering of the incident light, while allowing for transmission of the remaining light. For example, cyan, magenta and yellow colorants selectively absorb long, medium, and short wavelengths respectively in the spectral regions. Some colorants, such as most colored toners, impart color via a dye operable in transmissive mode. Other suitable colorants may operate in a reflective mode. Generally speaking, any desired color can be made from the combination of three or more primary colors in varying amounts. A "colorant model" is used to describe the amount of each primary color needed to form the desired color. Exemplary color models include the RGB additive color model and the CMYK subtractive color model. The CMYK model uses cyan, magenta, yellow, and black colorants to form all colors.

"Fluorescence" is an optical phenomenon whereby the molecular absorption of a photon triggers the emission of another photon with a longer wavelength.

A "fluorescent watermark" is a watermark embedded in the image that has the property of being relatively invisible under normal light, but relatively visible under ultraviolet light.

An "image" may be described as an array or pattern of pixels that are mapped in a two-dimensional format.

An array of numerical values representing an image is referred to as a "plane". The plane for a monochromatic or black-and-white (gray scale) image would be represented as a single two-dimensional array where the location of a pixel in the array corresponds to the location of the pixel in the image and the value stored in the pixel corresponds to the intensity of the image. Multicolor images contain multiple planes, one for each color. For example, rendering an image using the CMYK color model would require four planes, one for each color. Typically, the numerical value stored in a pixel is from 0 to 255 (i.e. stored in 8 bits). This numerical value may also be referred to as a "pixel value."

A "color space" refers to the combination of planes needed to render the image. For example, the color space of an image using the CMYK color model would be the combination of the four planes. The color space could alternatively be considered as an array of pixels, where each pixel location has an associated pixel value for each color. For example, a pixel at location (1,1) might have a quadruplet pixel value for C=230, M=153, Y=102, K=0.

A "mask" refers to a partial image or image layer that is overlaid on another image layer, mask, or screen to generate a complete image and/or a watermarked image.

A "screen" comprises pixel location information with associated threshold values.

An "illuminant" is a source of incident luminous energy specified by its relative spectral power distribution.

An "imaging device" is capable of generating, capturing, rendering, or displaying an image, including devices that store, transmit, and process image data. A color imaging device has the capability to utilize color attribute information.

"Luminance" is a photometric measure describing the amount of light that passes through or is emitted from a particular area, and falls within a given solid angle. Luminance indicates how much luminous power will be perceived by the human eye looking at the surface from a particular angle of view. It is therefore an indicator of how bright a surface will appear.

Common substrates used in digital printing, such as paper, contain a large amount of fluorescent whitening agent (FWA) or optical brightening agent (OBA) to increase the perceived whiteness of substrates. Inks or toners, on the other hand, are usually non-fluorescent materials. The fact that inks or toners suppress the fluorescent emission of substrates can be leveraged to design fluorescent watermarks. The fluorescent watermark is invisible under normal viewing condition, but can be detected under an ultraviolet (UV) light source. The underlying principle is that the substrate will fluoresce under UV illumination, while the ink/toner suppresses the fluorescence.

Halftoning is a known process of producing different scales of color. Conceptually, halftones are produced by grouping arrays of cells together into a halftone pixel. Within the pixel, some or all of the cells are printed. The scale depends on the number of cells in the pixel. For example, in an 8×8 pixel using only black ink, a grey scale having 65 possible shades ranging from solid black (all cells printed) to solid white (no cells printed) is possible. With higher numbers of cells in a pixel, higher resolution is possible. When color images are used, scales can be produced for each ink color, and when combined, the total color palette available for printing can be very large. Halftoning is described in *The Image Processing Handbook*, second edition, 1995, by John C. Russ, ISBN 0-8493-2516-1, and *Real World Scanning and Halftones*, second edition, 1998, by David Blatner, Glenn Fleishman, and Stephen F. Roth, ISBN 0-201-69683-5. Both of these books are hereby incorporated by reference in their entirety.

Different halftoning algorithms exist. One of such algorithms is called successive-filling halftoning algorithm and is described in U.S. Pat. No. 6,844,941 to Sharma et al., which is hereby incorporated by reference in its entirety. This algorithm can be implemented with two difference strategies. One strategy is referred to as dot-on-dot. This strategy maximizes the usage of black ink by applying the maximum gray component replacement (GCR) value possible. In addition, CMY inks are superimposed as much as possible. A second strategy is referred to as dot-off-dot. This strategy does not employ the use of black ink and minimizes the amount of ink that overlaps. As might be evident, dot-on-dot and dot-off-dot strategies can be considered as being opposite to each other.

Figure 1B:
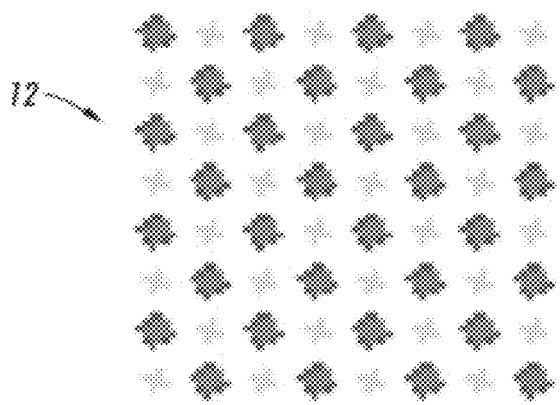
Figure 1C:
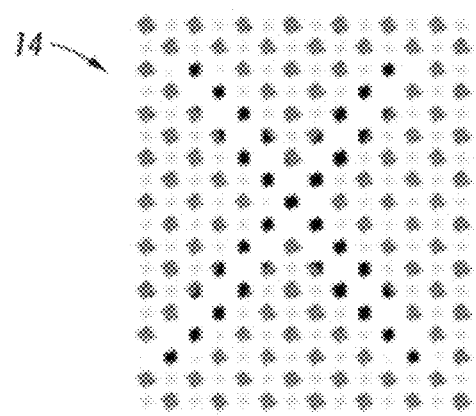
FIG. 1C illustrates an example of the watermarked image formed using two color patterns in FIGS. 1A and 1B.

An example of these two halftoning strategies is shown in FIG. 1. FIG. 1A is a pattern 10 produced using the dot-on-dot strategy, while FIG. 1B is a pattern 12 produced using the dot-off-dot strategy. FIG. 1A is made up of only black dots, while FIG. 1B is made up of only CMY dots. FIG. 1C is an example of a watermark 14 in which text is hidden in a distracting background by combining the patterns 10 and 12. The difference between the spectra of the patterns 10 and 12 is small, and the color differences between these two patterns are less than 1 ΔEab for both CIE illuminant D50 and CIE illuminant A. In other words, these two patterns (at normal resolution) have approximately same color appearance to the human eye under normal light.

Dot-off-dot halftoning strategy covers more of the substrate (e.g., paper) than dot-on-dot halftoning strategy. As a result, the dot-off-dot halftoning strategy suppresses substrate fluorescence (e.g., the fluorescence of paper) more efficiently, and the two patterns appear different under UV illumination. Thus, the combination of the two patterns 10 and 12 can result in an image that has a watermark 14. The two halftoning strategies also use a common halftone screen and the same successive-filling halftoning algorithm, which makes the transition between the two strategies smooth and keeps the halftone structure unaltered. In one embodiment the screen is a 16×16 group of pixels having a threshold pixel value in the range of 1-255.

The following explanation of the manner in which a halftoned image is constructed from the continuous-tone color image using the successive-filling halftoning algorithm is provided as follows. Each pixel of the continuous-tone image may be considered as having a pixel value from 0 to 255 (i.e. stored in 8 bits) for each color. After halftoning, each pixel of the halftoned image may be considered as have a pixel value either 0 or 1, (i.e., either 0 or 255, if the output values are stored in 8 bits) for each color. Since the human visual system tends to average out rapidly varying spatial patterns and perceives only a spatial average of the micro-variation in spot color, a close approximation to the desired color is produced in the halftone screen. This determination depends on the filling strategy.

The input continuous-tone color image is successively filled using two distinctive strategies. The inputs to the example algorithms are the continuous-tone pixel values for C, M, and Y. For the same input of CMY, as shown below, there is more bare paper shown in the region filled with the dot-on-dot strategy. Thus, when rendered using the dot-on-dot strategy, the image exhibits a greater amount (e.g., surface area) of uncovered fluorescent substrate, which appears lighter under UV illumination.

The successive-filling halftoning algorithms with both dot-on-dot and dot-off-dot strategies share the same halftone screen. The halftone screen composes pixel location information with associated threshold values. Generally speaking, the size of halftone screen is smaller than the size of image. The halftone screen is padded or repeated in two dimensions over the entire image, and so there is a corresponding threshold value for each pixel in the image. The pixel value for the continuous-tone image at a given pixel location is represented by the symbol "i", the corresponding threshold value in the padded screen is represented by the symbol T, and the output binary pixel value after halftoning at this location is represented by the symbol "o". The halftone conversion is achieved by thresholding the input pixel value i in the image by the threshold value T in the screen. The input pixel value is a continuous-tone CMY triplet ($i_c, i_m, i_y$) and the output pixel value is a binary CMYK quadruplet ($o_c, o_m, o_y, o_k$), such that:

$$o = \begin{cases} 1 & \text{if } i \geq T \\ 0 & \text{otherwise.} \end{cases}$$

The dot-on-dot strategy is to maximize the use of black ink and maximize the amount of overlap of the CMY inks. Depending on the relative amounts of the input values C, M and Y, there are six possible permutations (C≧M≧Y, C≧Y≧M, M≧C≧Y, M≧Y≧C, Y≧C≧M, Y≧M≧C). This can be generalized to $i_d \geq i_e \geq i_f$, where i refers to the pixel value for the given color, and d, e, and f indicate one of colors (C, M and Y). Black is printed when the threshold value is equal to $i_f$ based on the maximum GCR. Colors d and e are printed simultaneously where the pixel value is greater than $i_f$ but no greater than $i_e$. Finally, color d is printed when the pixel value is greater than $i_e$ but not greater than $i_d$. An example of pseudocode for dot-on-dot halftoning follows:

If $(i_d \geq i_e \geq i_f)$
    If $(i_f \geq T)$ then $o_k=1$ and $o_d=o_e=o_f=0$
    If $(i_f < T$ and $i_e \geq T)$ then $o_d=o_e=1$ and $o_k=o_f=0$
    If $(i_e < T$ and $i_d \geq T)$ then $o_d=1$ and $o_k=o_f=o_e=0$ In dot-off-dot, the strategy is to print CMY inks separately and overlap them only when necessary. Again, i refers to the pixel value for the given color (C, M, or Y). Cyan dots are printed where the screen value is less than or equal to $i_C$. Yellow dots are printed where the screen value is greater than $(255-i_y)$. Magenta dots are printed from $i_C$ up to 255. If the pixel value for magenta is greater than this range, magenta dots are printed on top of cyan dots up to $(i_M+i_C-255)$. An example of pseudocode for dot-off-dot halftoning follows:

If $(i_c \geq T)$ then $o_c=1$ and $o_k=o_m=o_y=0$
If $(i_y > 255-T)$ then $o_y=1$ and $o_k=o_c=o_m=0$.
If $(i_c < T \leq i_c+i_m)$ or $(i_c+i_m > 255$ and $i_c+i_m > 255+T)$
    then $o_m=1$ and $o_k=o_c=o_y=0$.

Figure 2:
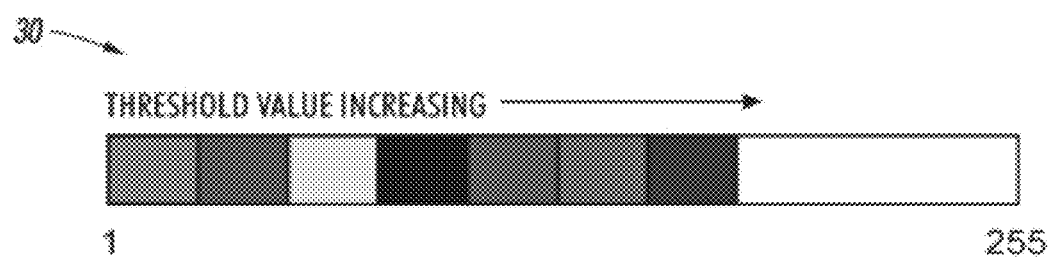
FIG. 2 illustrates a color map associated with the successive-filling halftoning algorithm.

The threshold value of the halftone screen varies from 1 to 255. For a given continuous-tone pixel value, the color map indicates the corresponding binary output at each threshold value, as shown in FIG. 2. The difference in the color maps generated with the two halftone strategies can be seen in three different examples, as described below and illustrated in FIG. 3.

FIG. 2 illustrates a color map 30, where the color indicates the halftoned output values, and the color bar indicates the range of threshold values. In the illustrated example:

Cyan Color $o_c=1$ and $o_k=o_m=o_y=0$
Magenta Color $o_m=1$ and $o_k=o_c=o_y=0$
Yellow Color $o_y=1$ and $o_k=o_c=o_m=0$
Black Color $o_k=1$ and $o_c=o_m=o_y=0$
Red Color $o_m=o_y=1$ and $o_k=o_c=0$
Green Color $o_c=o_y=1$ and $o_k=o_m=0$
Blue Color $o_c=o_m=1$ and $o_k=o_y=0$
White Color $o_k=o_c=o_m=o_y=0$ For any given combination of CMY, a color map can be generated, and the color map indicates the halftoned output values for any threshold value between 1 and 255.

Figure 3:
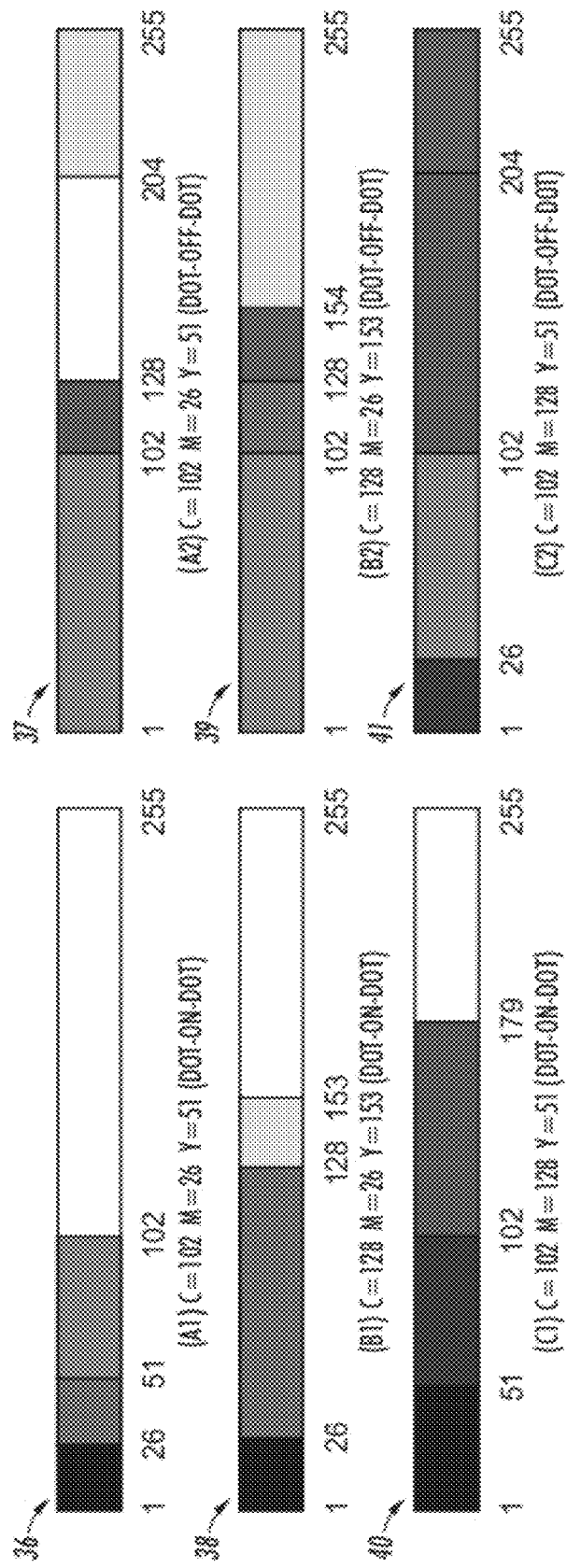
FIG. 3 illustrates several color maps generated using the successive-filling halftoning algorithm with both the dot-on-dot and dot-off-dot strategies.

In FIG. 3, a plurality of color maps illustrate various examples of a successive-filling algorithm with both the dot-on-dot and dot-off-dot strategies.

For color maps 36 and 37, C=102, M=26, and Y=51
Under a dot-on-dot halftone strategy shown in color map 36:

T=1-26: $i_k=1$ and $o_c=o_m=o_y=0$
T=27-51: $o_c=o_y=1$ and $o_k=o_m=0$
T=52-102: $o_c=1$ and $o_k=o_m=o_y=0$
T=103-255: $o_k=o_c=o_m=o_y=0$ Under a dot-off-dot halftone strategy, as shown in color map 37:

T=1-102: $o_c=1$ and $o_k=o_m=o_y=0$
T=103-128: $o_m=1$ and $o_k=o_c=o_y=0$
T=129-204: $o_k=o_c=o_m=o_y=0$
T=205-255: $o_y=1$ and $o_k=o_c=o_m=0$ There is more white space in the dot-on-dot color map than the dot-off-dot color map.

Color maps 38 and 39 illustrate examples of a successive-filling dot-on-dot and dot-off-dot strategies, respectively, having the following properties: C=128, M=26, Y=153.

Under a dot-on-dot halftone strategy, the color map 38 would result:

T=1-26: $o_k=1$ and $o_c=o_m=o_y=0$
T=27-128: $o_c=o_y=1$ and $o_k=o_m=0$
T=129-153: $o_y=1$ and $o_k=o_c=o_m=0$
T=154-255: $o_k=o_c=o_m=o_y=0$ Under a dot-off-dot halftone strategy, the color map 39 results:

T=1-102: $o_c=1$ and $o_k=o_m=o_y=0$
T=103-128: $o_c=o_y=1$ and $o_k=o_m=0$
T=129-154: $o_y=1$ and $o_k=o_c=o_m=0$
T=155-255: $o_y=1$ and $o_k=o_c=o_m=0$ There is white space in the dot-on-dot color map, but not in the dot-off-dot color map.

Color maps 40 and 41 show examples of successive-filling dot-on-dot and dot-off-dot strategies, respectively, having the following properties: C=102, M=179, Y=51.

Under a dot-on-dot halftone strategy, the color map 40 would result:

T=1-51: $o_k=1$ and $o_c=o_m=o_y=0$
T=52-102: $o_c=o_m=1$ and $o_k=o_y=0$
T=103-179: $o_m=1$ and $o_k=o_c=o_y=0$
T=180-255: $o_k=o_c=o_m=o_y=0$ Under a dot-off-dot halftone strategy, the color map 41 results:

T=1-26: $o_c=o_m=1$ and $o_k=o_y=0$
T=27-102: $o_c=1$ and $o_m=o_y=0$
T=103-204: $o_m=1$ and $o_k=o_c=o_y=0$
T=205-255: $o_y=o_m=1$ and $o_k=o_c=0$ It may be noted that there is white space, i.e., $o_c=o_m=o_y=o_k=0$, in the dot-on-dot color map, but not in the dot-off-dot color map.

Figure 4:
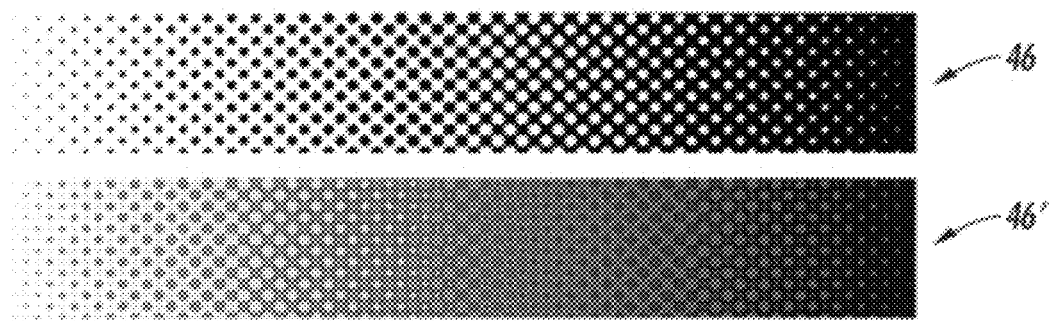
FIG. 4 shows a gray sweep 46 from CMY=0 to CMY=100% processed with the successive-filling halftoning algorithm with the dot-on-dot strategy, and the same gray sweep 46' processed with the successive-filling halftoning algorithm with the dot-off-dot strategy.

FIG. 4 shows the gray sweep 46 from CMY=0 to CMY=100% processed with the dot-on-dot strategy, and the same gray sweep 46' processed with the dot-off-dot strategy. In some embodiments of the dot-on-dot halftone screen, only black dots are printed, if a maximum gray component replacement (GCR) threshold has been reached (e.g., the CMY values that add to grey all along the tone scale are replaced with black ink).

Figure 5A:
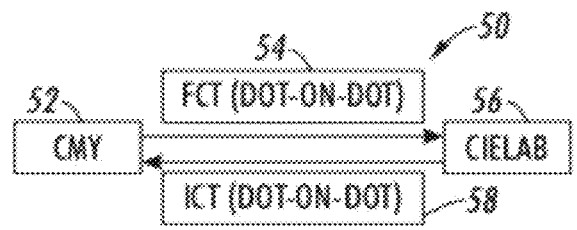
FIGS. 5A-C illustrate flow diagrams for performing a standard printer characterization for the successive-filling halftoning algorithm for both the dot-on-dot and dot-off-dot strategies, and for building a lookup table that facilitates transforming a color image from a first CMY color space to a second CMY color space.
Figure 5B:
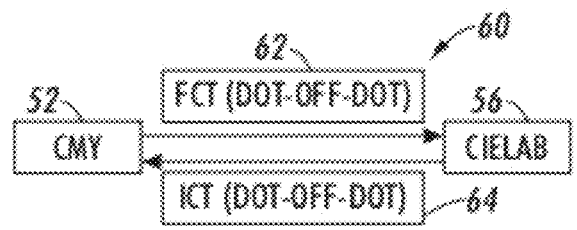
Figure 5C:
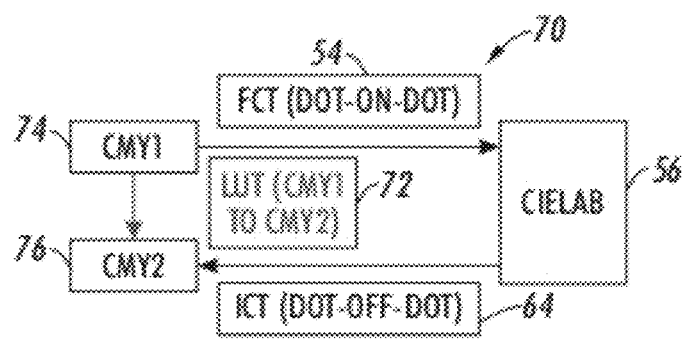

FIGS. 5A-C illustrate flow diagrams for performing dot-on-dot halftoning, dot-off-dot halftoning, and for building a lookup table that facilitates transforming colorant space from dot-on-dot (CMY1) to dot-off-dot (CMY2). Accordingly, FIG. 5A shows flow diagram 50 for a standard printer characterization constructed for the dot-on-dot halftoning strategy, wherein each printer characterization involves a forward color transformation (FCT) and an inverse color transformation (ICT). The forward color transformation 54 for the dot-on-dot halftoning strategy map the colors from CMY space 52 to CIELAB space 56, while the inverse color transformation 58 map the colors from CIELAB space 56 to CMY space 52

FIG. 5B shows flow diagram 60 for a standard printer characterization constructed for the dot-off-dot halftoning strategy, wherein the colors in CMY space 52 are mapped to the colors in CIELAB space 56 using a forward color transformation (FCT) 62, and visa verse.

FIG. 5C illustrates a method flowchart 70 in which a lookup table 72 is created to transform the colorant space for dot-on-dot image data (abbreviated CMY1) 74 to the colorant space for dot-off-dot image data (abbreviated CMY2) 76. For example, given a CIELAB image, two separate inverse color transforms can be applied to obtain CMY1 and CMY2. Alternatively, given CMY1 74, a forward color transformation 54 is applied to obtain the CIELAB image 56, and an inverse color transform 64 applied to the CIELAB image data 56 to obtain CMY2 76. Such color transformation are known in the art for these two halftone strategies. In this manner, CMY1 image data is mapped to CMY2 image data through CIELAB color space by successive FCT 54 and ICT 64 constructed for the dot-on-dot strategy and dot-off-dot strategy, respectively. The mappings between CMY1 and CMY2 are stored in the lookup table 72 for use in watermark image generation.

Figure 6:
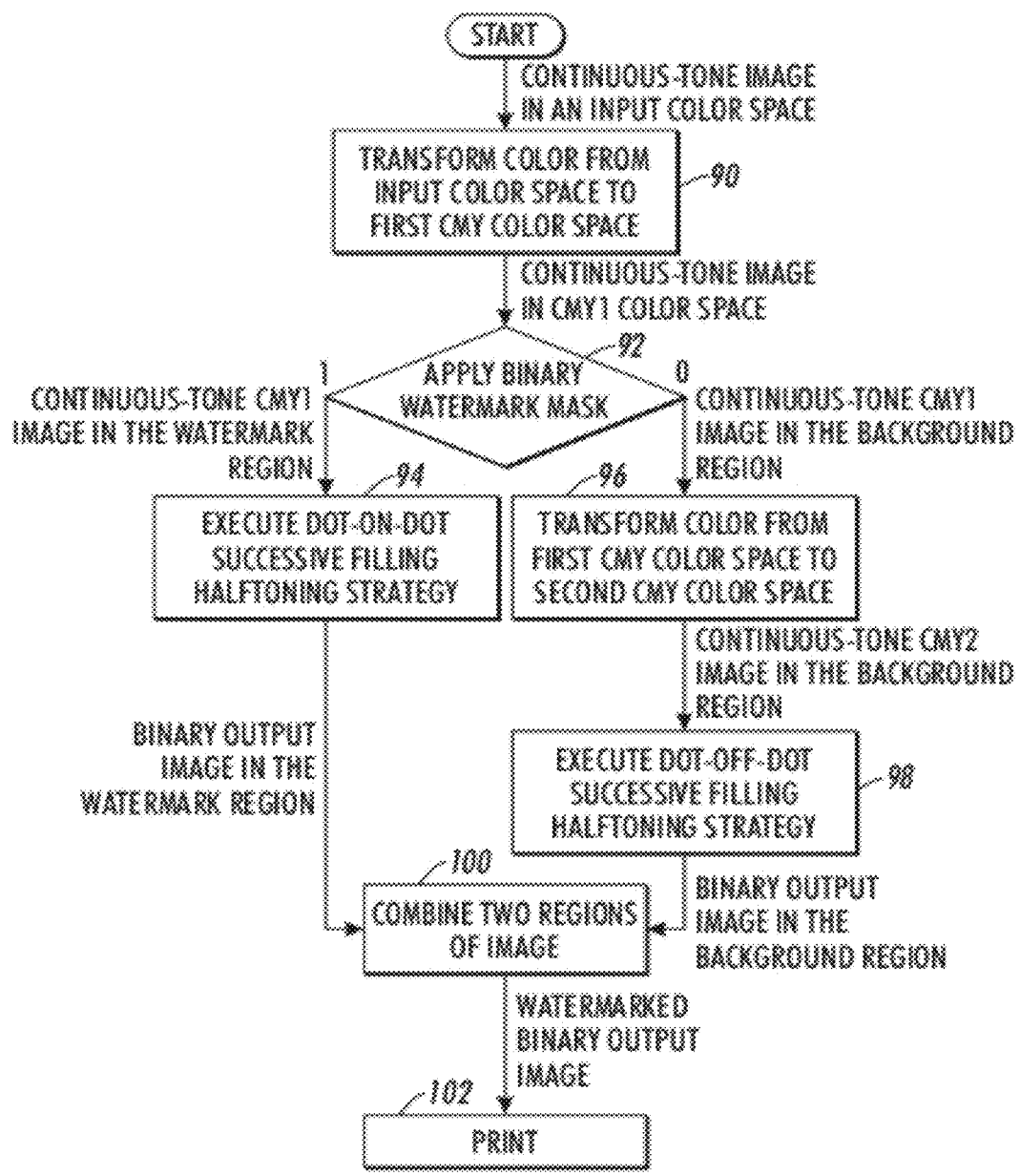
FIG. 6 illustrates a method of generating an ultraviolet fluorescent watermark in an image, in accordance with various aspects described herein.

FIG. 6 illustrates a method of generating an ultraviolet fluorescent watermark in an image, in accordance with various aspects described herein. At 90, a continuous tone color image in an initial or input color space (e.g., CIELAB, RGB, etc.) is transformed from the input color space to a first CMY color space. A binary watermark mask is applied to the continuous tone image in the first CMY color space (CMY1), at 92. Pixels in a watermark region of the continuous tone CMY1 image correspond to a binary value of 1, while pixels in a background region of the continuous tone CMY1 image correspond to a binary value of 0. It will be understood that the described correspondence of pixels in the watermark region with a binary "1" and pixels in the background region with a binary "0" is arbitrary, and may be inverted as a matter of design.

At 94, the successive filling halftoning algorithm with the dot-on-dot strategy is executed on pixels in the watermark region of continuous tone CMY1 image to generate a binary output image in the watermark region. Concurrently, at 96, the continuous tone CMY1 image in the background region has its color transformed from the first CMY color space to a second color space (CMY2). At 98, the successive filling halftoning algorithm with the dot-off-dot strategy is executed on the continuous tone CMY2 image in the background region, to generate a binary output image in the background region.

At 100, the binary output image in the background region and the binary output image in the watermark image are combined to form a complete watermarked binary output image. The watermarked binary output image is printed on a fluorescent substrate (e.g., paper) at 102.

According to one aspect, the successive-filling halftoning algorithm with the dot-on-dot strategy performed at 94 maximizes the use of black ink and overlays CMY inks as much as possible. According to another aspect, the successive-filling halftoning algorithm with the dot-off-dot strategy performed at 98 does not use black ink and overlays CMY inks as little as possible. In another aspect, the dot-on-dot and dot-off dot halftoning strategies use a common or shared halftoning screen, which may comprise pixel locations with associated threshold values.

According to other aspects the color transformation at 96 employs two printer characterizations, one involving a forward printer transformation and one involving an inverse printer transformation, such as are discussed with regard to FIGS. 5A-C. The first printer characterization is constructed for the successive-filling halftoning algorithm with the dot-on-dot strategy, and the second printer characterization is constructed for the successive-filling halftoning algorithm with the dot-off-dot strategy.

In another example, the second color transformation (e.g., from CMY1 to CMY2) is a concatenated transformation of the forward printer transformation for the successive-filling halftoning algorithm with the dot-on-dot strategy and the inverse printer transformation for the successive filling halftoning algorithm with the dot-off-dot strategy. The second color transformation may be executed as a function of a table lookup (e.g., accessing a lookup table stored in memory).

Figure 7:
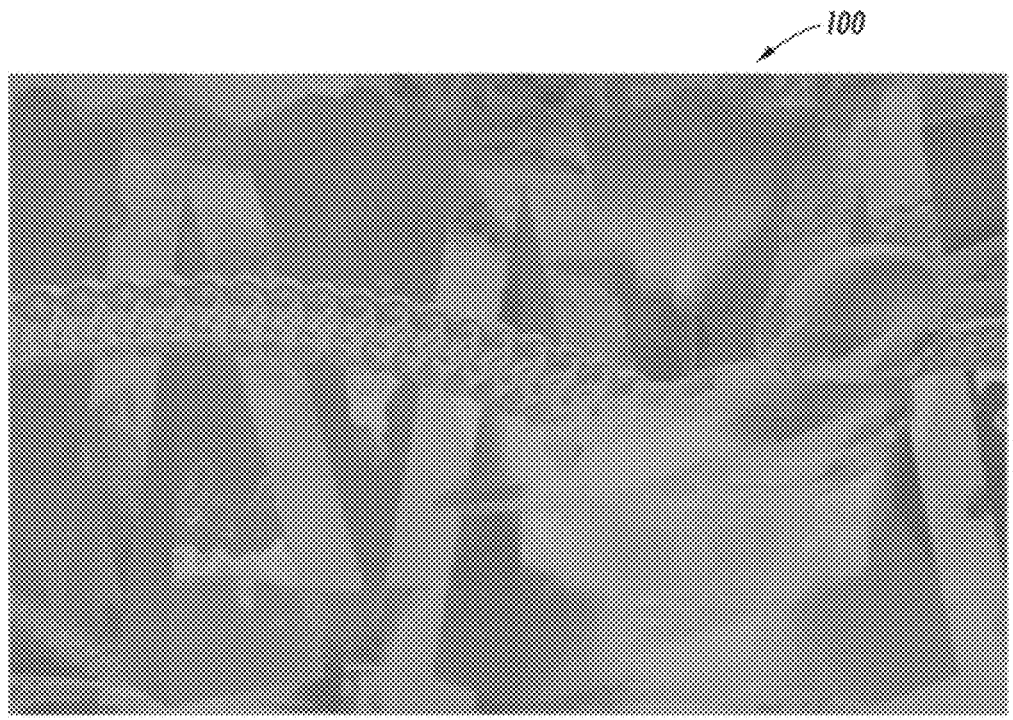
FIG. 7 illustrates an example of the watermarked image, which is formed using the method of FIG. 6.

FIG. 7 illustrates an example of the watermarked image 100, which is formed using the method of FIG. 6. The watermarked image 100 of FIG. 7 is shown as illuminated under normal light.

Figure 8:
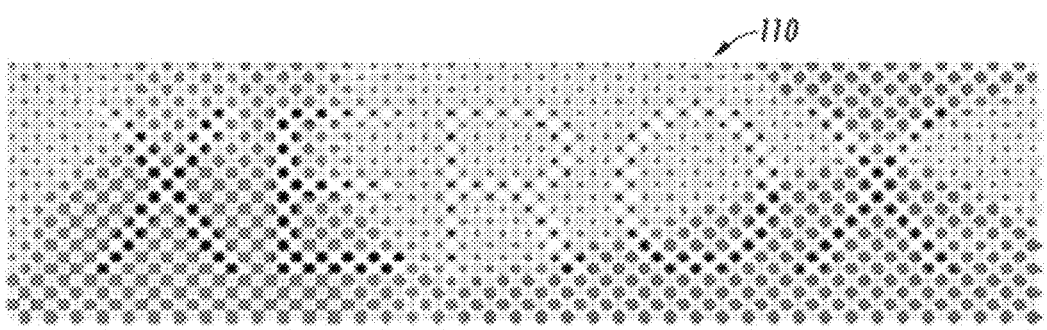
FIG. 8 is an enlarged portion of the watermark image of FIG. 7, showing the overlapping color patterns.

FIG. 8 is an enlarged portion 110 of the watermark image 100 of FIG. 7, showing the overlapping color patterns.

Figure 9:
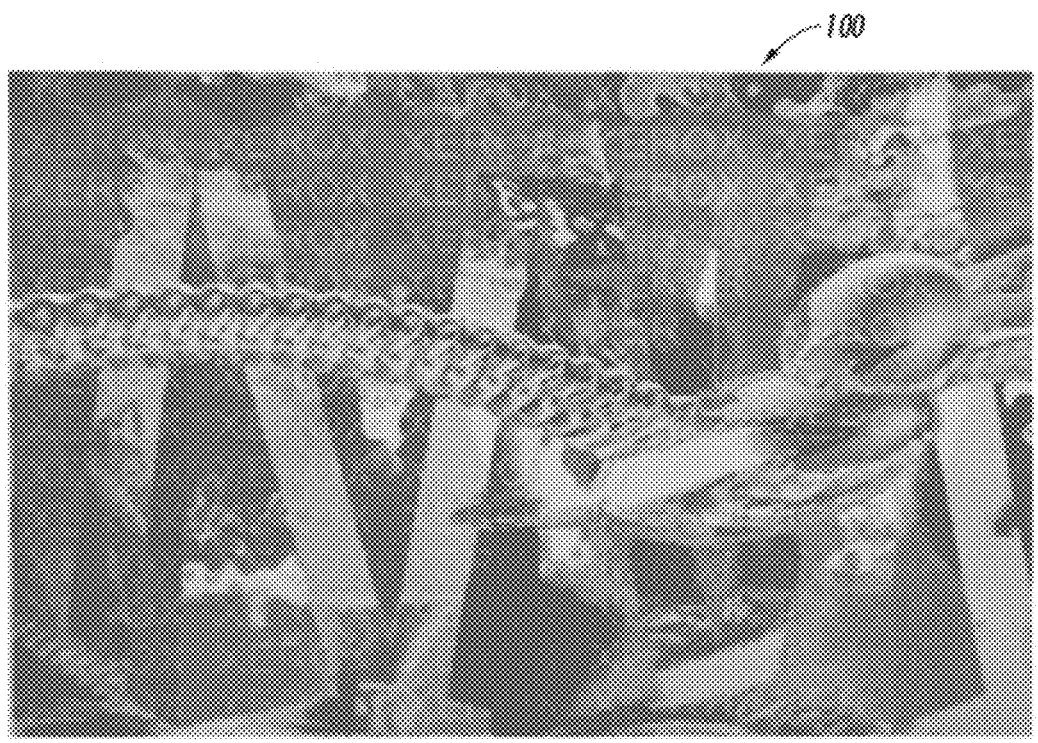
FIG. 9 shows the watermarked image as seen under UV light in a standard light booth, where the watermark is easily revealed.

FIG. 9 shows the watermarked image 100 as seen under UV light in a standard light booth, where the watermark is easily revealed. The watermark can be produced over the entire image or over only a small portion of the image, as desired.

Figure 10:
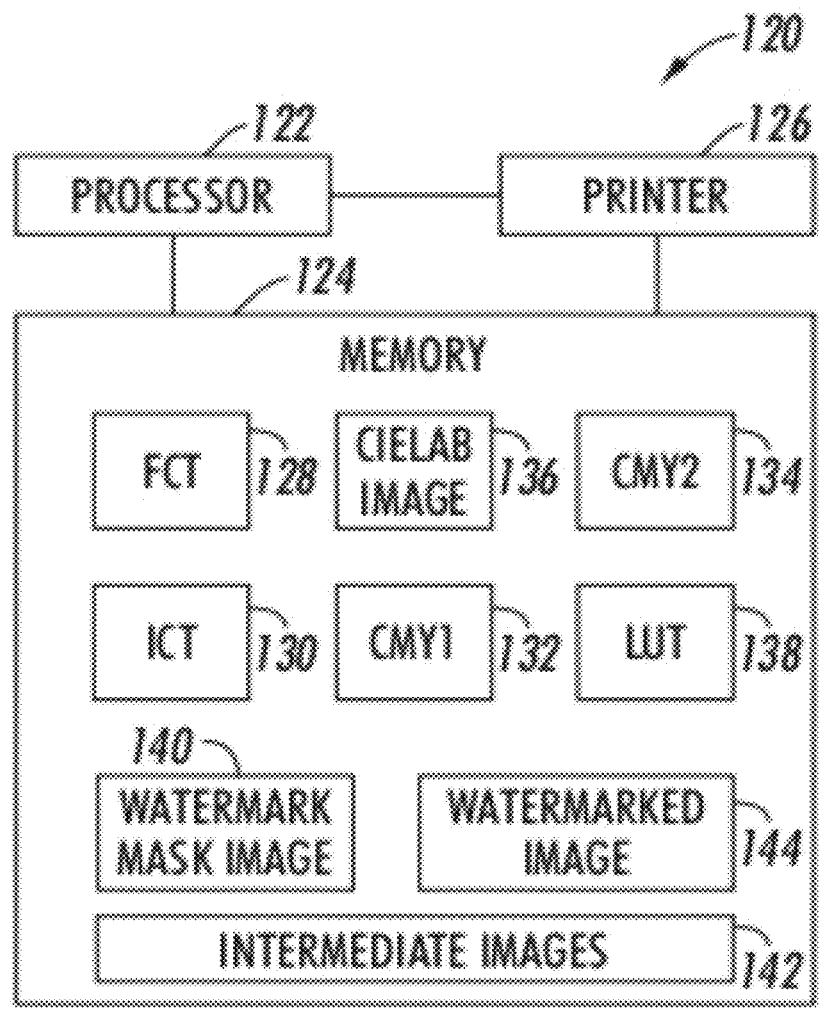
FIG. 10 illustrates a system that facilitates generating a watermarked image, in accordance with various aspects described herein.

FIG. 10 illustrates a system 120 that facilitates generating a watermarked image, in accordance with various aspects described herein. The system 120 includes a processor 122 that executes, and a memory 124 that stores, computer-executable instructions and/or algorithms for performing the various functions described herein. The system additionally includes a printer 126 that prints a watermarked image generated by the processor 122.

For example, the memory 124 stores one or more forward color transformations 128 and one or more inverse color transformation that convert CMY1 image data 132 and/or CMY2 image data to CIELAB image data 136, and vice versa. In one embodiment, a lookup table 138 is generated and stored to memory 124 to transform the colorant space for dot-on-dot CMY1 image data 132 to the colorant space for dot-off-dot image data CMY2 134. For example, given a CIELAB image 136, two separate inverse color transformations 130 can be applied to obtain CMY1 data 132 and CMY2 data 134. Alternatively, given CMY1 data 132, a forward color transform 128 is applied to obtain the CIELAB image 136, and an inverse color transform 130 applied to the CIELAB image data 136 to obtain CMY2 data 134. Such color transforms are known in the art for these two halftone strategies. In this manner, CMY1 image data 132 is mapped by the processor 122 to CMY2 image data 134 through CIELAB color space by successive FCT 128 and ICT 130 constructed for the successive-filling halftoning algorithm with the dot-on-dot and dot-off-dot strategies, respectively. The mappings between CMY1 and CMY2 are stored in the lookup table 138 for use in watermark image generation.

The processor 122 generates a watermarked image 144, using the LUT 138, in accordance with one or more aspects described herein. A given image, such as a CIELAB image 136, can be transformed into a continuous-tone image in CMY1 space 132 using an inverse color transformation 130 constructed for the dot-on-dot strategy. The watermark mask image 140 separates the continuous-tone CMY1 image into two regions: the background region and the watermark region. The continuous-tone CMY1 image in the watermark region is halftoned with the dot-on-dot strategy, while the continuous-tone CMY1 image in the background region is first transformed into the CMY2 image in the background region using the LUT 138 and then halftoned with the dot-off-dot strategy. Finally, the binary watermarked image 144 is combining the binary images in both the watermark and background regions.

In this manner, the disclose embodiments facilitate generating UV fluorescent encoded images using two successive-filling halftone strategies. Halftone design, color management, and image rendering are combined into a single step. An underlying principal of UV security application in standard 4-color printing is that the substrate's fluoresce is suppressed by inks or tones applied to the substrate. The dot-on-dot halftone strategy is applied to maximize the usage of black ink and superimpose CMY inks as much as possible on the substrate, while the as dot-off-dot halftone strategy is applied to allow minimal ink overlapping. The outcomes of these two strategies exhibit different bare paper coverage, which in turn affects UV response under UV illumination. The watermark is formed with one halftoning strategy, while the distracting background is formed with the other strategy. The hidden watermark is thus invisible under normal lighting but revealed under UV illumination.

Figure 11:
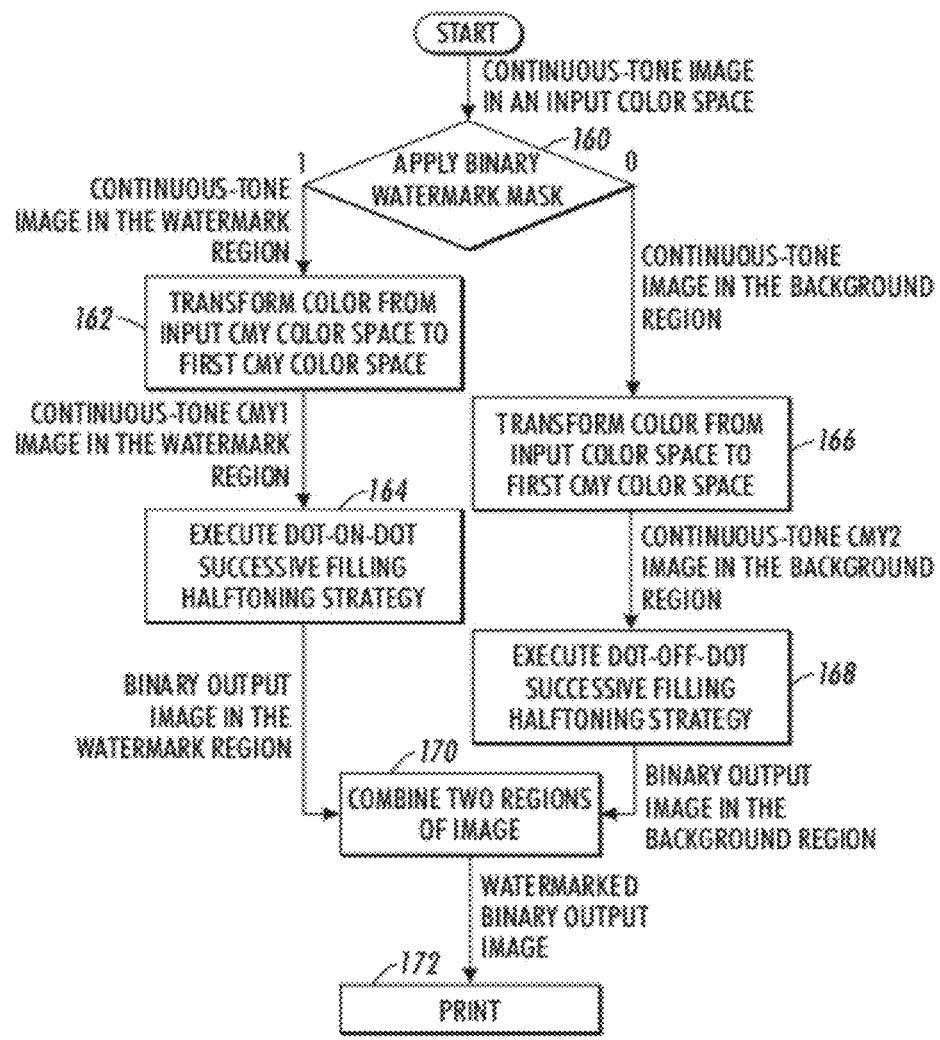
FIG. 11 illustrates a method of illustrates a method of generating an ultraviolet fluorescent watermark in an image, in accordance with various aspects described herein.

FIG. 11 illustrates a method of generating an ultraviolet fluorescent watermark in an image, in accordance with various aspects described herein. A binary watermark mask is applied to the continuous tone image in an input color space, at 160. Pixels in a watermark region of the continuous tone input image correspond to a binary value of 1, while pixels in a background region of the continuous tone input image correspond to a binary value of 0. It will be understood that the described correspondence of pixels in the watermark region with a binary "1" and pixels in the background region with a binary "0" is arbitrary, and may be inverted as a matter of design.

At 162, the continuous tone color image in the watermark region is transformed from the input color space (e.g., CIELAB, RGB, etc.) to a first CMY color space (CMY1). At 164, a successive filling halftoning algorithm with the dot-on-dot strategy is executed on pixels in the watermark region of continuous tone CMY1 image to generate a binary output image in the watermark region. Concurrently, at 166, the continuous tone input image in the background region has its color transformed from the input color space to a second color space (CMY2). At 168, a dot-off-dot successive filling halftoning algorithm or strategy is executed on the continuous tone CMY2 image in the background region, to generate a binary output image in the background region.

At 170, the binary output image in the background region and the binary output image in the watermark image are combined to form a complete watermarked binary output image. The watermarked binary output image is printed on a fluorescent substrate (e.g., paper) at 172.

According to one aspect, the dot-on-dot successive-filling halftoning strategy performed at 164 maximizes the use of black ink and overlays CMY inks as much as possible. According to another aspect, the dot-off-dot successive-filling halftoning strategy performed at 168 does not use black ink and overlays CMY inks as little as possible. In another aspect, the dot-on-dot and dot-off dot halftoning strategies use a common or shared halftoning screen, which may comprise pixel locations with associated threshold values.

According to other aspects the color transformation at 166 employs two printer characterizations for these two halftoning strategies, wherein each printer characterization involves a forward printer transformation and an inverse printer transformation, such as are discussed with regard to FIGS. 5A-C. The first printer characterization is constructed for the dot-on-dot successive-filling halftoning algorithm, and the second printer characterization is constructed for the dot-off-dot successive-filling halftoning algorithm.

Modifications and alterations to the present disclosure will occur to others upon reading and understanding the preceding detailed description. It is intended that the exemplary embodiments be construed as including all such modifications and alterations insofar as they come within the scope of the appended claims or the equivalents thereof.

The invention claimed is:

1. A method of generating an ultraviolet (UV) fluorescent watermark in an image, comprising:
   selecting an electronic continuous-tone color image in an input color space for a document;
   generating a binary watermark mask that divides the continuous-tone color image into two regions including a watermark region and a background region;
   performing a first color transformation that converts the continuous-tone color image in the watermark region from the input color space to a first CMY color space;
   executing a successive-filling halftoning algorithm with a dot-on-dot strategy on the continuous-tone color image in the watermark region to generate a first binary output image in the watermark region;
   performing a second color transformation that converts the continuous-tone color image in the background region from the input color space to a second CMY color space;
   executing a successive-filling halftoning algorithm with a dot-off-dot strategy on the continuous-tone color image in the background region to generate a second binary output image in the background region;
   generating a watermarked binary output image embedded with UV fluorescent watermark by combining the first binary output image in the watermark region with the second binary output image in the background region; and
   printing the watermarked binary output image on a fluorescent substrate.

2. The method of claim 1, wherein the input color space is one of RGB color space, CIELAB color space and other color spaces.

3. The method of claim 1, wherein the watermark region and background region are exchangeable.

4. The method of claim 1, wherein the successive-filling halftoning algorithm with the dot-on-dot strategy maximizes the usage of black ink and overlays CMY inks.

5. The method of claim 1, wherein the successive-filling halftoning algorithm with the dot-off-dot strategy minimizes the usage of black ink and CMY ink overlap.

6. The method of claim 1, wherein the successive-filling halftoning algorithms with both dot-on-dot and dot-off-dot strategies share a common halftone screen that comprises pixel location information with associated threshold values.

7. The method of claim 1, wherein the first color transformation is built based upon a standard printer characterization constructed for the successive-filling halftoning algorithm with the dot-on-dot strategy.

8. The method of claim 1, wherein the second color transformation is built based upon a standard printer characterization constructed for the successive-filling halftoning algorithm with the dot-off-dot strategy.

9. The method of claim 1, wherein a given input color in the watermark region is transformed to the first CMY space by the first color transformation and halftoned using the successive-filling halftoning algorithm with the dot-on-dot strategy, and the same input color in the background region is transformed to the second CMY space by the second color transformation and halftoned using the successive-filling halftoning algorithm with the dot-off-dot strategy, and the output binary patterns in the watermark region and the background region are a close metameric color match under normal illumination but remain visually distinct in their response under ultra-violet light, and wherein the output binary pattern in the watermark region cover less of the substrate than the output binary pattern in the background region.

10. A method of generating an ultraviolet (UV) fluorescent watermark in an image, comprising:
    selecting an electronic continuous-tone color image in an input color space for a document;
    performing a first color transformation that converts the continuous-tone color image from the input color space to a first CMY color space;

generating a binary watermark mask that divides the continuous-tone color image into two regions including a watermark region and a background region;

executing a successive-filling halftoning algorithm with a dot-on-dot strategy on the continuous-tone color image in the watermark region to generate a first binary output image in the watermark region;

performing a second color transformation that converts the continuous-tone color image in the background region from the first CMY color space to a second CMY color space;

executing a successive-filling halftoning algorithm with a dot-off-dot strategy on the continuous-tone color image in the background region to generate a second binary output image in the background region;

generating a watermarked binary output image embedded with UV fluorescent watermark by combining the first binary output image in the watermark region with the second binary output image in the background region; and printing the watermarked binary output image on a fluorescent substrate.

11. The method of claim 10, wherein the input color space is one of RGB color space, CIELAB color space and other color spaces.

12. The method of claim 10, wherein the watermark region and background region are exchangeable.

13. The method of claim 10, wherein the successive-filling halftoning algorithm with the dot-on-dot strategy maximizes the usage of black ink and overlays CMY inks.

14. The method of claim 10, wherein the successive-filling halftoning algorithm with the dot-off-dot strategy minimizes the usage of black ink and CMY ink overlap.

15. The method of claim 10, wherein the successive-filling halftoning algorithms with both dot-on-dot and dot-off-dot strategies share a common halftone screen, which comprises pixel location information with associated threshold values.

16. The method of claim 10, wherein the first color transformation is built based upon a standard printer characterization constructed for the successive-filling halftoning algorithm with the dot-on-dot strategy.

17. The method of claim 10, wherein the second color transformation is built based upon first and second standard printer characterizations, wherein each printer characterization involves a forward printer transformation and an inverse printer transformation.

18. The method of claim 17, wherein the first printer characterization is built based upon a standard printer characterization constructed for the successive-filling halftoning algorithm with the dot-on-dot strategy, and wherein the second printer characterization is built based upon a standard printer characterization constructed for the successive-filling halftoning algorithm with the dot-off-dot strategy.

19. The method of claim 17, wherein the second color transformation is a concatenated transformation of the forward printer transformation for the successive-filling halftoning algorithm with the dot-on-dot strategy, and for an inverse printer transformation for the successive-filling halftoning algorithm with the dot-off-dot strategy.

20. A system that facilitates generating UV fluorescent images using the successive-filling halftoning algorithms with both dot-on-dot and dot-off-dot strategies, comprising:

a memory that stores, and a processor that executes, computer-executable instructions for:

selecting an electronic continuous-tone color image in an input color space for a document;

generating a binary watermark mask that divides the continuous-tone color image into two regions including a watermark region and a background region;

performing a first color transformation that converts the continuous-tone color image in the watermark region from the input color space to a first CMY color space;

executing a successive-filling halftoning algorithm with a dot-on-dot strategy on the continuous-tone color image in the watermark region to generate a first binary output image in the watermark region;

performing a second color transformation that converts the continuous-tone color image in the background region from the input color space to a second CMY color space;

executing a successive-filling halftoning algorithm with a dot-off-dot strategy on the continuous-tone color image in the background region to generate a second binary output image in the background region;

generating a watermarked binary output image embedded with UV fluorescent watermark by combining the first binary output image in the watermark region with the second binary output image in the background region; and a printer that prints the watermarked binary output image on a fluorescent substrate.

* * * * *